(12) United States Patent
Keeler

(10) Patent No.: US 9,529,854 B2
(45) Date of Patent: Dec. 27, 2016

(54) PROVIDING LOCATION-BASED SERVICES IN A DISTRIBUTED ENVIRONMENT WITHOUT DIRECT CONTROL OVER THE POINT OF ACCESS

(75) Inventor: James D. Keeler, Austin, TX (US)

(73) Assignee: Wayport, Inc., Austin, TX (US)

( * ) Notice: Subject to any disclaimer, the term of this patent is extended or adjusted under 35 U.S.C. 154(b) by 602 days.

(21) Appl. No.: 11/854,100

(22) Filed: Sep. 12, 2007

(65) Prior Publication Data

US 2008/0065774 A1 Mar. 13, 2008

Related U.S. Application Data

(60) Provisional application No. 60/825,358, filed on Sep. 12, 2006.

(51) Int. Cl.
| | |
|---|---|
| G06F 15/16 | (2006.01) |
| G06F 17/30 | (2006.01) |
| H04W 4/02 | (2009.01) |
| H04W 4/18 | (2009.01) |
| H04W 4/20 | (2009.01) |
| H04L 29/08 | (2006.01) |

(52) U.S. Cl.
CPC ......... *G06F 17/30528* (2013.01); *H04L 67/18* (2013.01); *H04W 4/02* (2013.01); *H04W 4/18* (2013.01); *H04W 4/20* (2013.01); *H04L 67/306* (2013.01)

(58) Field of Classification Search
CPC ............. H04W 4/02; H04W 4/18; H04W 4/20
USPC ....................................................... 709/203
See application file for complete search history.

(56) References Cited

U.S. PATENT DOCUMENTS 6,757,740 B1 * 6/2004 Parekh et al. ................ 709/245
2002/0150083 A1 * 10/2002 Fangman et al. ............ 370/352
(Continued)

FOREIGN PATENT DOCUMENTS

EP 1301058 A1 * 4/2003
JP H08-249569 A 9/1996
(Continued)

OTHER PUBLICATIONS

Richard W. Stevens; "TCP/IP Illustrated, vol. 1: The Protocols"; Chapter 1, Introduction; pp. 1-19; Addison-Wesley Publishing Company, Reading, Massachusetts; 1994.
(Continued)

*Primary Examiner* — Derrick Ferris
*Assistant Examiner* — Farhad Ali
(74) *Attorney, Agent, or Firm* — Toler Law Group, PC

(57) ABSTRACT

A method, system and computer program product for providing location-specific content to a personal computing device (PCD) connected to a distributed server network (such as the Internet) without requiring an access control gateway to provide such content. Location-specific (and user-specific) content/services are provided by a client-server architecture utilizing a location database and a location look-up utility of a location identifier and content retrieval (LICR) server. Specifically, a utility executing on the PCD provides PCD location parameters to the LICR server, which is equipped with a location look up engine/functionality and a location content retrieval engine/functionality (both within a LICR utility) that responds by providing location-specific and user-specific content to the PCD.

24 Claims, 8 Drawing Sheets

(56) References Cited

U.S. PATENT DOCUMENTS

| | | | |
|---|---|---|---|
| 2004/0023666 A1* | 2/2004 | Moon et al. | 455/456.1 |
| 2005/0143174 A1* | 6/2005 | Goldman et al. | 463/42 |
| 2005/0170851 A1* | 8/2005 | Melpignano et al. | 455/456.5 |
| 2006/0167747 A1* | 7/2006 | Goodman et al. | 705/14 |
| 2006/0178215 A1* | 8/2006 | Lehikoinen et al. | 463/39 |
| 2006/0200843 A1* | 9/2006 | Morgan et al. | 725/80 |
| 2007/0011268 A1* | 1/2007 | Banga | G06Q 30/02 709/217 |
| 2007/0234321 A1* | 10/2007 | Mcdowali | G06F 9/44526 717/141 |
| 2008/0039205 A1* | 2/2008 | Ackley et al. | 463/40 |
| 2010/0285817 A1* | 11/2010 | Zhao et al. | 455/456.3 |

FOREIGN PATENT DOCUMENTS

| | | |
|---|---|---|
| JP | 2001289645 A | 10/2001 |
| JP | 2002140329 A | 5/2002 |
| JP | 2002150497 A | 5/2002 |
| JP | 2002199434 A | 7/2002 |
| JP | 2003016351 A | 1/2003 |
| JP | 2004132717 A | 4/2004 |
| JP | 2004341827 A | 12/2004 |
| JP | 2005061966 A | 3/2005 |
| JP | 2005202397 A | 7/2005 |
| JP | 2005522098 A | 7/2005 |
| JP | 2006155537 A | 6/2006 |
| WO | 2006054419 A1 | 5/2006 |
| WO | 2008033913 A3 | 3/2008 |

OTHER PUBLICATIONS

Richard W. Stevens; "TCP/IP Illustrated, vol. 1 The Protocols"; Chapter 2, Link Layer; pp. 21-32; Addison-Wesley Publishing Company, Reading, Massachusetts; 1994.

Richard W. Stevens; "TTCP/IP Illustrated, vol. 1: The Protocols"; Chapter 7, Ping Program; pp. 85-96; Addison-Wesley Publishing Company, Reading, Massachusetts; 1994.

Richard W. Stevens; "TCP/IP Illustrated, vol. 1: The Protocols"; Chapter 8, Traceroute; pp. 97-109; Addison-Wesley Publishing Company, Reading, Massachusetts; 1994.

Extended European Search Report for EP Application No. 07842316.7 from the European Patent Office dated Dec. 2, 2010, 9 pages.

International Search Report of the International Searching Authority for International Application No. PCT/US07/78259 mailed Jun. 12, 2008, 1 page.

Office Action mailed Feb. 15, 2012 issued in Japanese Application No. 2009-528449 with English translation, 6 pages.

De Almeida, D.R. et al., "A Context-Aware System Based on Service-Oriented Architecture," Proceedings of the 20th International Conference on Advanced Information Networking and Applications, IEEE Computer Society, vol. 1, Apr. 18-20, 2006, pp. 205-210.

Griswold, W.G. et al., "ActiveCampus: Experiments in Community-Oriented Ubiquitous Computing," Computer, IEEE Service Center, vol. 37, No. 10, Oct. 1, 2004, pp. 73-81.

Paciga, M. et al., "Herecast: An Open Infrastructure for Location-Based Services Using Wifi," IEEE International Conference on Wireless and Mobile Computing, Networking and Communications, vol. 4, Aug. 22-24, 2005, pp. 21-28.

Wei, L. et al., "Extending Instant Messaging to Provide Pervasive Personal Communication," International Workshop on System Support for Future Mobile Computing Applications, IEEE, Sep. 1, 2006, pp. 43-50.

Yu, J. et al., "Techniques for Determining the Geographic Location of IP Addresses in ISP Topology Measurement," Journal of Computer Science and Technology, Kluwer Academic Publishers, vol. 20, No. 5, Sep. 1, 2005, pp. 689-701.

International Preliminary Report on Patentability for International Application No. PCT/US2007/078259, issued Mar. 17, 2009, 4 pages.

* cited by examiner

PROVIDING LOCATION-BASED SERVICES IN A DISTRIBUTED ENVIRONMENT WITHOUT DIRECT CONTROL OVER THE POINT OF ACCESS

CLAIM OF PRIORITY

This present application claims priority from U.S. Provisional Patent Application Ser. No. 60/825,358 filed on Sep. 12, 2006, entitled "System And Method For Providing Location Based Services In A Distributed Environment Without Direct Control Over The Point Of Access." Relevant content of that provisional application is incorporated herein by reference.

BACKGROUND OF THE INVENTION

1. Field of the Invention

The present invention relates generally to the field of computer networks, and more specifically, to receiving content from distributed computer networks. Still more particularly, the present invention relates to receiving location-specific content from distributed computer networks.

2. Description of the Related Art

Several Internet service providers (ISPs) provide Internet (or background network) access via access points, commonly referred to as "hot-spots," at public locations such as hotels, airports, restaurants. As Internet users become more and more mobile (with the proliferation of mobile computers and web access over portable personal devices, such as cell phones, PDAs, and the like), one area of growth has been the demand for location-based services when accessing the Internet via localized access points. These access points are locations at which a customer's personal computing device (PCD) connects to and accesses the background network, such as the Internet.

There are two different access configurations by which a PCD connects to the general server network at these access points. In a first access configuration, an access controller of the ISPs limits user access to the Internet or background network until some user/device credentials and/or payment are presented to the access controller. The user/device credential may be tied to a user account that provides paid access to the ISPs services. In a second access configuration, no user credential and/or payment are required and no specific access controller is provided to limit and/or restrict who may access the ISP services.

FIG. 1 illustrates a conventional logical network connection from a PCD to the Internet, using an access control gateway of an ISP in a first of two access configurations. As shown, ISP 100 has an access control gateway 110 that controls whether the user's PCD 170 is allowed to connect to the Internet 140. Access control gateway 110 is coupled to NDU 110, which allows PCD 170 to establish the connection (wired or wireless) to ISP 100. ISP 100 further comprises a firewall 120 and web server 130. Access control gateway 110 utilizes firewall 120 to controls the level of connectivity provided to PCD 170, by blocking access to Internet 140 until the customer (PCD user) pays for the access and/or agrees to terms of use (perhaps for free access). The execution of firewall and generation of prompts for payment and/or acceptance of terms of use is provided by web server 130.

As illustrated by FIG. 2, when PCD 170 establishes a connection to ISP 100 (via NDU 105) and a web browser is opened on PCD 170, the requested page on the web-browser is re-directed to welcome/login page(s), e.g., gateway pages 1-L 215, hosted on the ISP's web server 130. The welcome/login pages (215) present connection options, payment terms, terms of use, and other information that are displayed on/within the web browser of the PCD 170. The presentation of these pages (215) and subsequent interactions therewith by the user of the PCD is referred to as the "initial connection process".

As illustrated in FIG. 2, there may be several pages (gateway pages 1-L 115) which the user of the PCD may see on the ISP's web server 130 during the initial connection process. Typically this process completes with a final page on which the user finally accepts usage terms and/or completes the input of payment credentials. After the user completes the input of the credential and/or payment information, the firewall 120 blocking the access to the Internet 140 is removed, and the user is then able to browse Internet pages 245 from the background Internet 140.

The ISP's access control gateway 110, gateway web server 130 and firewall 120 may be locally located relative to the location of the NDU 105 or remotely located. From the PCD 170 and/or PCD user's perspective, the network/Internet access is being provided locally at the location of the NDU 105. Thus, the current state of the art uses the access control gateway 110 to present pages (215) that might have local services for the customer (i.e., PCD user) to utilize. These services may include advertising, local directions, local sites of interest, etc.

As more people utilize local access points to access the greater Internet, there exists an increasing demand for information that is local to the user, such as locations of shops, entertainment, medical facilities/hospitals, and the like, so that the user has quick access to information of the services available in the user's surrounding vicinity. Many ISPs have utilized the access control gateways and particularly the gateway pages during the initial connection process to provide localized content, based primarily on the known location of the particular access point to which the PCD is connected.

The current state of the art in providing localized advertising by the ISP (100) involves gathering information on the customer during the initial connection process. With the information gathered, the gateway web server (130) optionally provides selective (location-specific) advertising, content, or other items of interest to the customer within the gateway pages 1-L 215. The PCD user thus views this content during the initial connection process. This content may be content of a third party which the ISP charges a fee to display on the gateway pages 1-L 215. After this initial connection process, however, the ISP "loses control" of the customer and has no way of presenting further advertising or other items of interest to the customer. Hence, the state of the art is that the ISP has no practical method of offering location specific content on the internet pages 245. Moreover, there is no mechanism to provide local services for locations without access control.

Providing localized content to a user is somewhat limited to the information received from the user during the initial connection process and/or to preset information programmed for presentation on the gateway pages (215) provided when accessing the ISP by pre-designated NDUs 105. In addition to these described limitations with the conventional implementations, several other limitations exist. For example, there are many different ISPs that provide access control, and the access controllers of these different ISPs are typically all different in their functionality. This variation across ISPs proves to be distracting to a user who may want to be provided local services, but may find that the access to such local services is unavailable with certain ISPs. Additionally, the type of information provided across the ISPs may be very different and/or the access mechanisms for such local information may function very differently with other ISPs. Moreover, there is no known conventional mechanism for providing these local services at gateway sites to which access is not controlled by an access control gateway 110 having a known geographic location.

SUMMARY OF THE CLAIMED SUBJECT MATTER

The disclosed embodiments provide a computing device and a method and computer program product executing within the computing device for providing location-specific content to a personal computing device (PCD) connected to a distributed server network (such as the Internet) without requiring an access control gateway to provide such content. Location-specific (and user-specific) content/services are provided by a client-server architecture utilizing a location database and a location look-up utility of a location identifier and content retrieval (LICR) server. Specifically, a utility executing on the PCD provides PCD location parameters to the LICR server, which is equipped with a location look up engine/functionality and a location content retrieval engine/functionality (both within a LICR utility) that responds by providing location-specific and user-specific content to the PCD.

In one embodiment, the computing device executes a location specific content retrieval (LSCR) utility, which detects a connection of the computing device to a network via an access device and provides the functions of: retrieving a location identifier (ID) of a network distribution unit (NDU) at which the computing device connects to the network, where the location ID is one of an Internet Protocol (IP) address and a Media Access Control (MAC) address of the NDU; providing the location ID as one of one or more location parameters; automatically transmitting one or more location parameters to a network address associated with a pre-defined location identifier and content retrieval (LICR) server on the network, where the location ID is utilized by the LICR server to determine a current location of the computing device by accessing one of an IP-to-location database and a MAC-to-location database; receiving a response having content related to a location identified by one of the location parameters transmitted; and providing location specific information from the content within the response.

In one embodiment, the LSCR utility further provides the functions of: identifying as the location ID an address of an access device, which enables access by the data processing device to the network; and when the address is an RFC-1918 private address, translating the address into an IP address, where said IP address is matched within an IP address-to-location database at the LICR server to determine the current location of the computing device; and when the address is a public address: examining a sub-net via address resolution protocol (ARP) for IP block information; and transmitting the IP block information as the location ID to the LICR server.

The LICR server enables the server-side features of the invention. The LICR server comprises a processor, access to one or more databases having location specific data thereon and accessible by the processor; and a LICR (server) utility, which includes specific code that is executed by the processor to perform the server-side functions. These functions include: receiving one or more location parameters from a computing device connected via a network, where the one or more location parameters includes at least one or an Internet Protocol (IP) address and a Media Access Control (MAC) address of a network access location for the computing device; determining a location of the computing device from the one or more location parameters by accessing one of an IP-to-location database and a MAC-to-location database; retrieving location specific content corresponding to the location from a database of content generally associated with a plurality of locations; and forwarding the location specific content to the computing device.

In another embodiment, the LICR server utility further comprises code for: parsing the location parameters for a location ID corresponding to a location of the computing device; and comparing the location ID to a plurality of location IDs within a database of location IDs, each associated with a corresponding location, where the location ID is one of the IP address and the MAC address and the comparing comprises one of (a) comparing the location ID to IP addresses within the IP-to-location database when the location ID is the IP address and (b) comparing the location ID to MAC addresses within the MAC-to-location database when the location ID is the MAC address. When a match of the location ID is found within the database of location IDs, the utility further retrieves a corresponding location as the location of the computing device; and when the location of the computing device cannot be determined from the one or more location parameters, the utility: generates a request for additional location ID information; and transmits the request to the computing device.

The above as well as additional objectives, features, and advantages of the present invention will become apparent in the following detailed written description.

BRIEF DESCRIPTION OF THE DRAWINGS

This invention is described in a preferred embodiment in the following description with reference to the drawings, in which like numbers represent the same or similar elements, as follows.

DETAILED DESCRIPTION OF ILLUSTRATIVE EMBODIMENTS

Generally, the illustrative and described embodiments provide a method, system and computer program product for providing location-specific content to a personal computing device (PCD) connected to a distributed server network (such as the Internet) without requiring an access control gateway to provide such content. Location-specific (and user-specific) content/services are provided by a client-server architecture utilizing a location database and a location look-up utility of a location identifier and content retrieval (LICR) server. Specifically, a utility executing on the PCD provides PCD location parameters to the LICR server, which is equipped with a location look up engine/functionality and a location content retrieval engine/functionality (both within a LICR utility) that responds by providing location-specific and user-specific content to the PCD.

Figure 3:
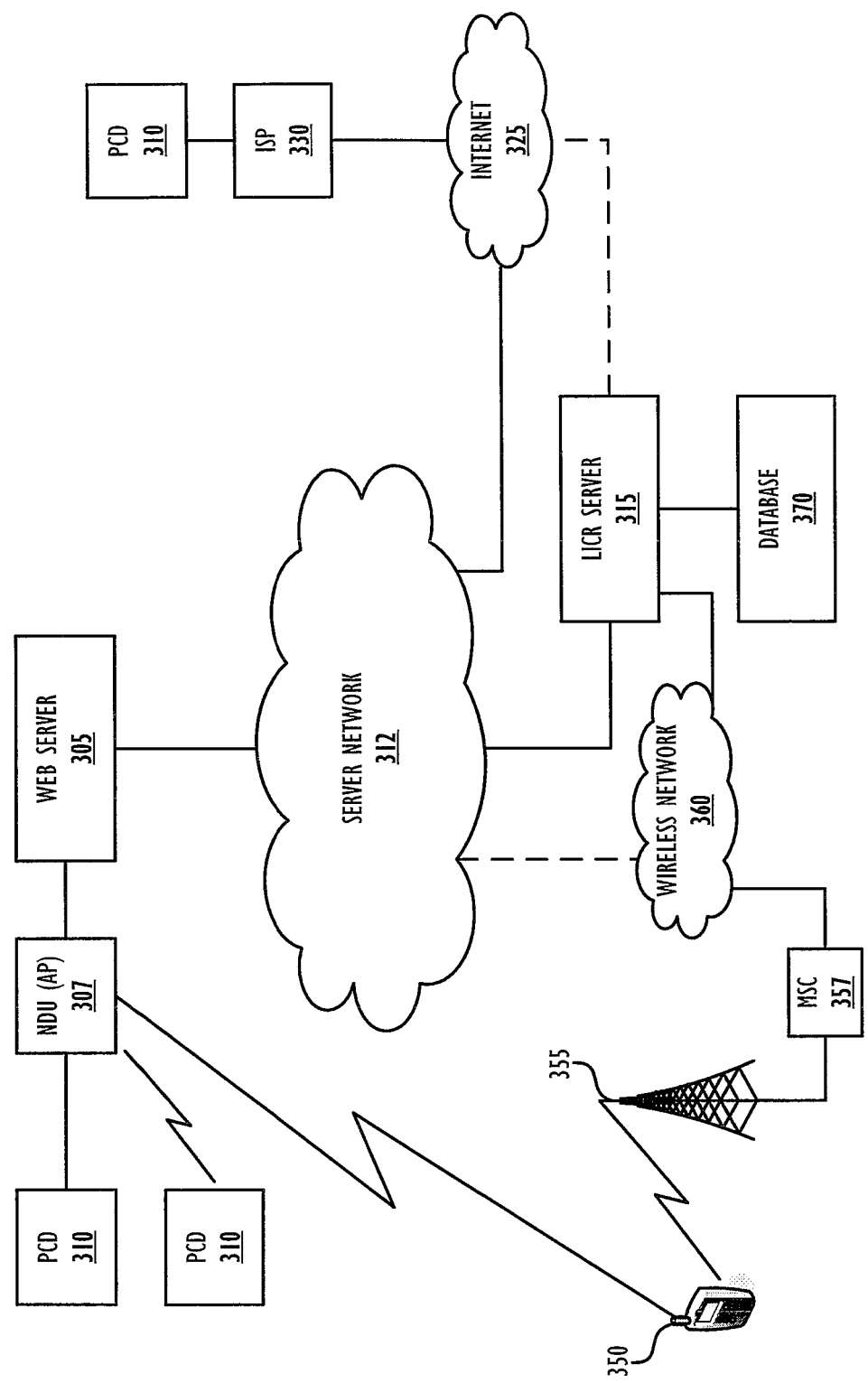
FIG. 3 provides an example network, which includes a location identifier and content retrieval (LICR) server and one or more PCDs, including a mobile phone, in accordance with one embodiment of the invention.
Figure 4A:
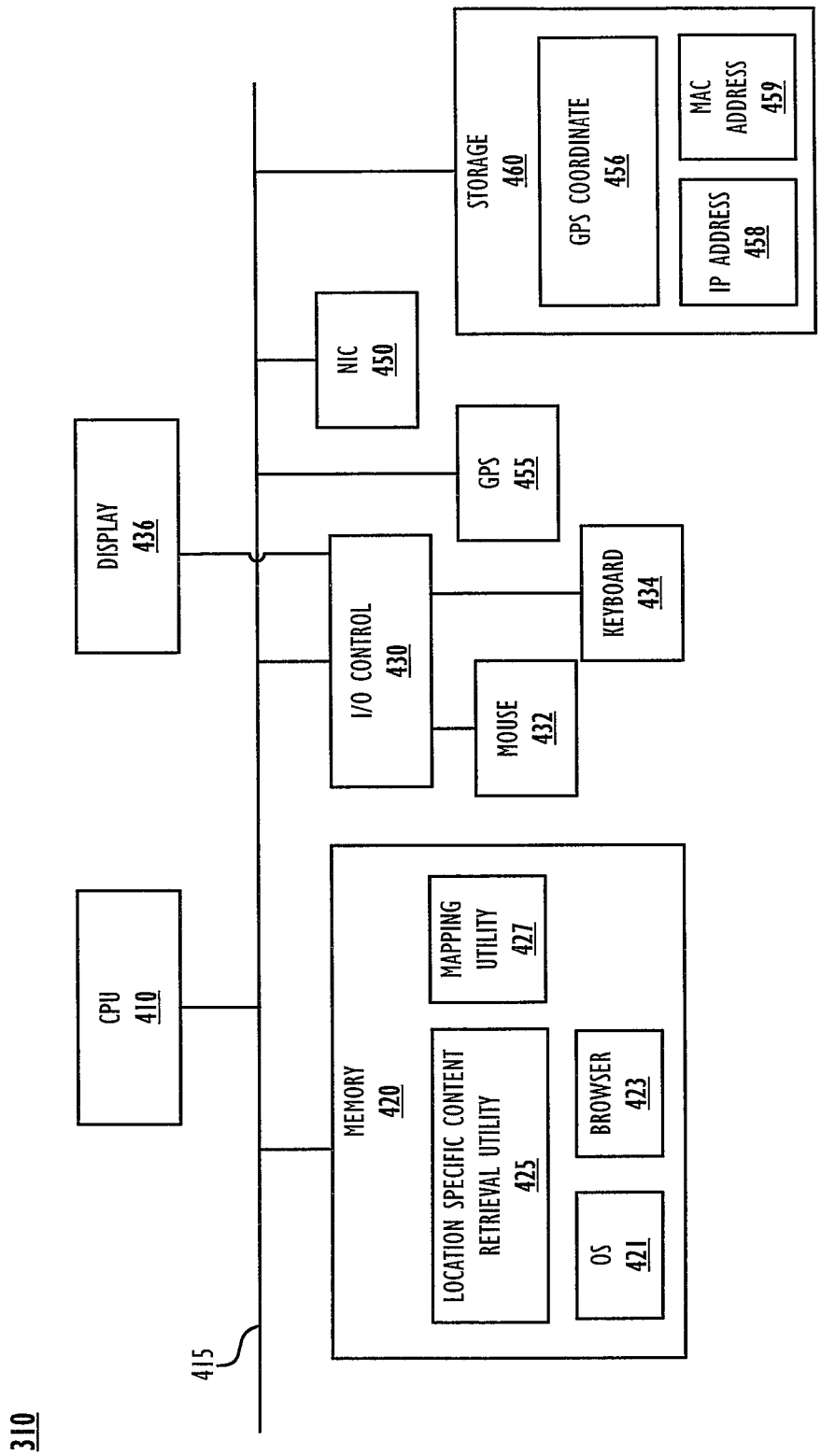
FIG. 4A is a block diagram illustrating an example PCD configured to support retrieval of localized content from a LICR server, according to one embodiment of the invention.
Figure 4B:
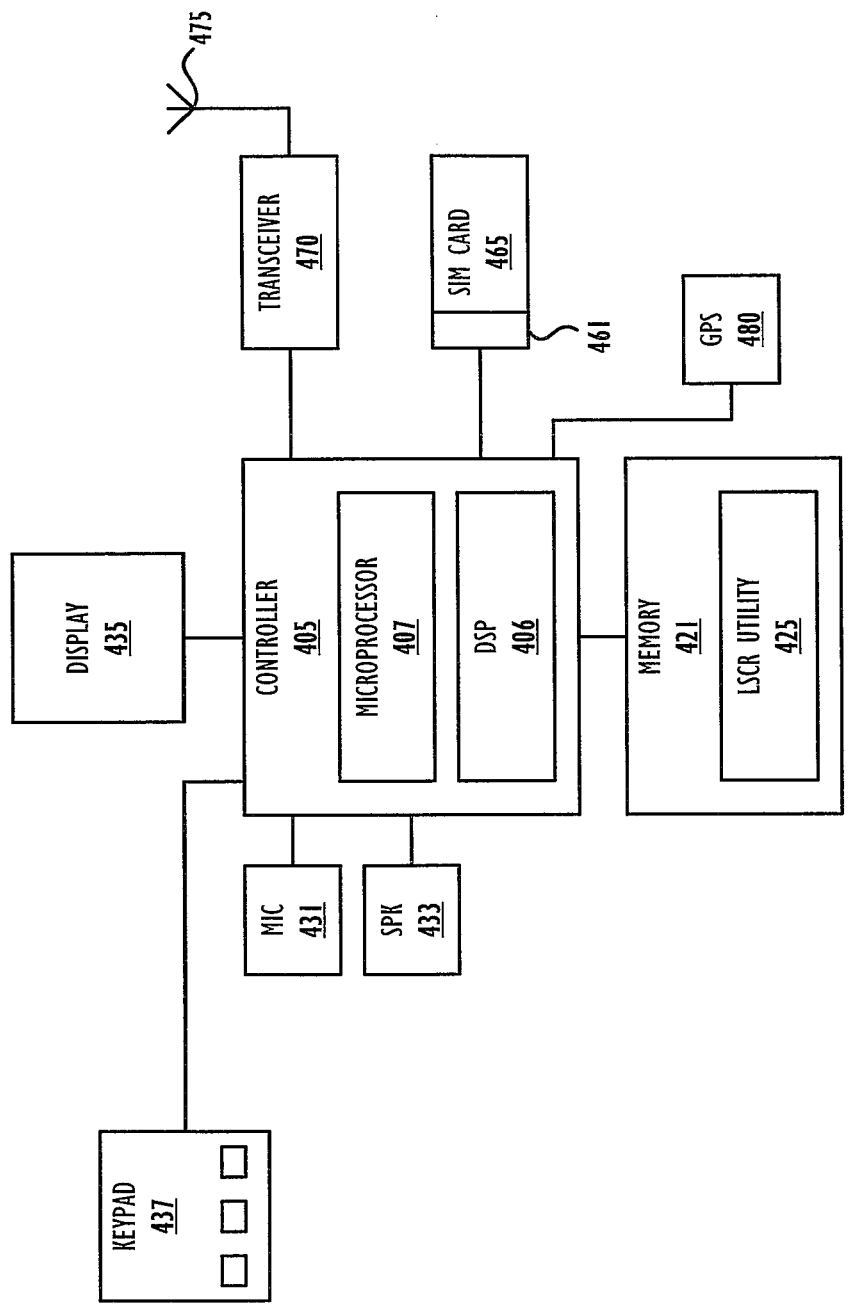
FIG. 4B is a block diagram representation of component parts of a mobile phone operating as the example PCD, which is configured to support retrieval of localized content from a LICR server, according to one embodiment of the invention.
Figure 5:
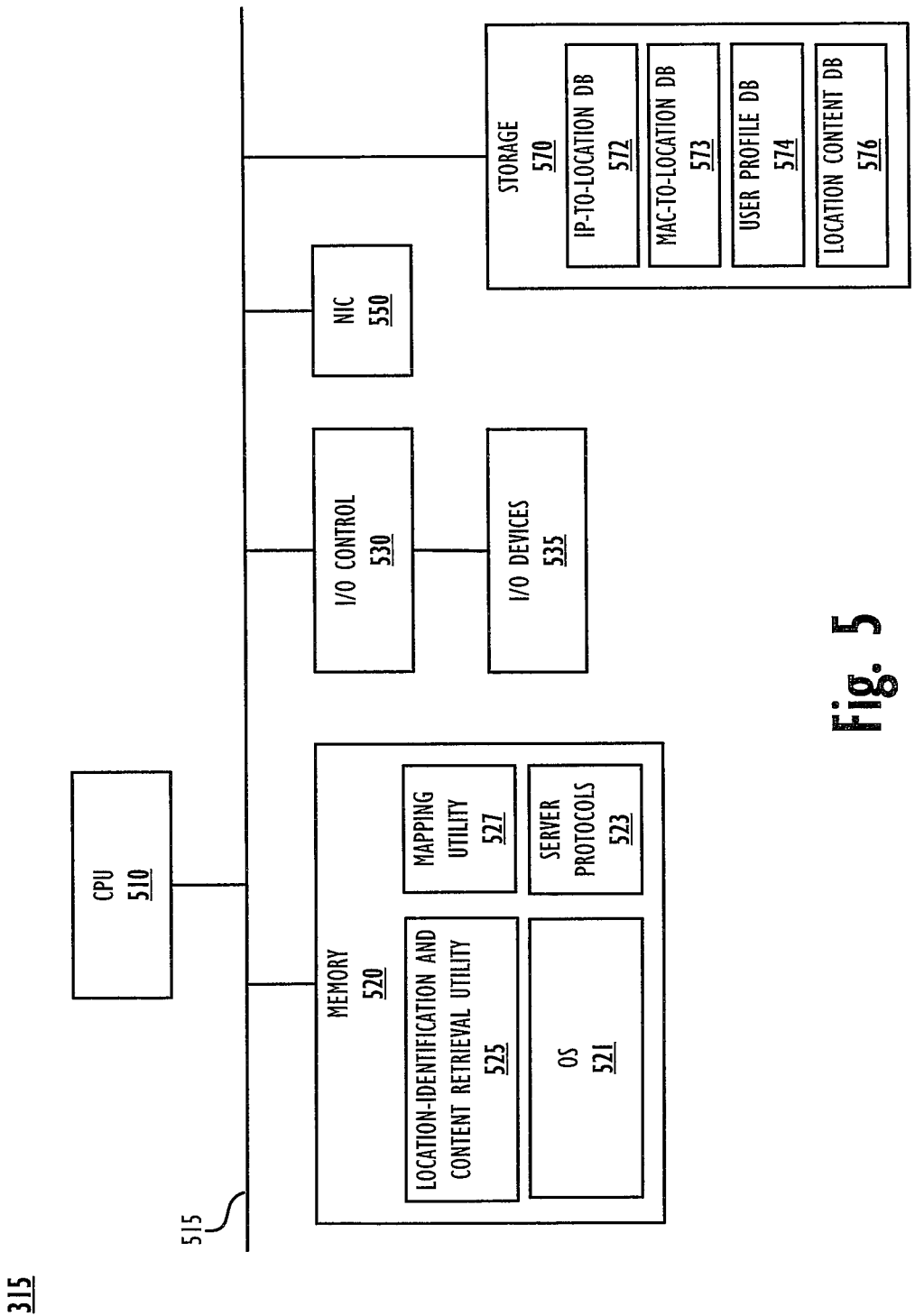
FIG. 5 is a block diagram illustrating an example LICR server configured to provide location-specific content to a requesting PCD, in accordance with one embodiment of the invention.
Figure 6:
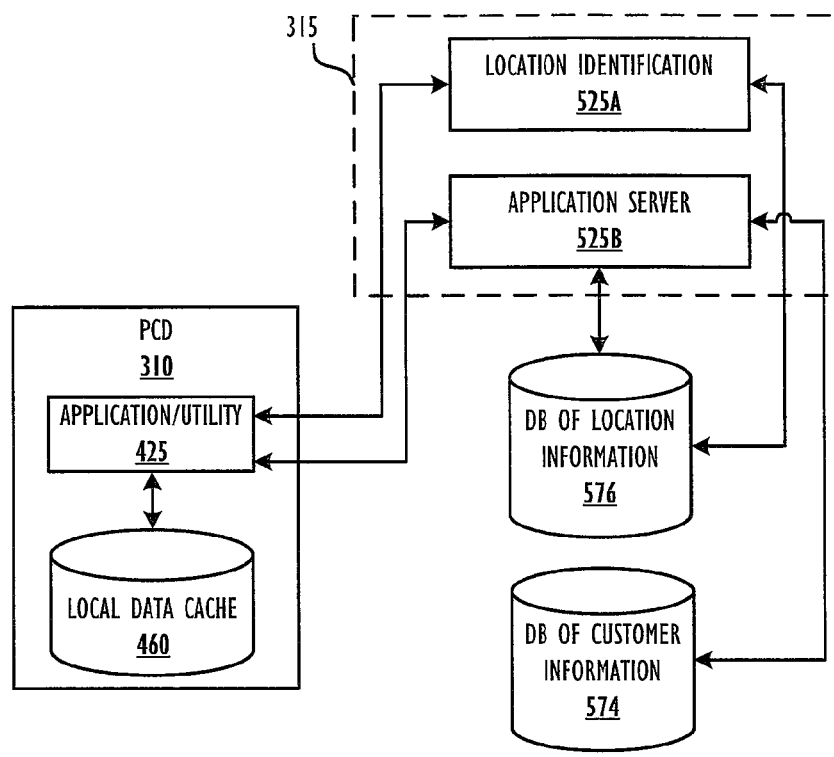
FIG. 6 provides an information exchange diagram between an application/utility of a PCD and functional components of a LICR server, in accordance with one embodiment of the invention.

The PCD is configured to independently retrieve location-specific content/services from a pre-programmed (and pre-identified) LICR server implementing the LICR utility (as shown in FIG. 6) in a distributed server network, such as is illustrated by FIG. 3. The specific functional features are provided by one or more utilities that are executed by the example customer personal computing device (PCD), such as illustrated by FIGS. 4A, 4B and by the example LICR server, as illustrated by FIG. 5.

In the following detailed description of exemplary embodiments of the invention, specific exemplary embodiments in which the invention may be practiced are described in sufficient detail to enable those skilled in the art to practice the invention. It should be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIG. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. For example, as utilized herein location specific content refers to any type of information related to a building, business, street, person, device, service, store/shop, and the like, that exists within a geographic location that is in proximity to the PCD. Proximity is then defined by the LICR server or perhaps by the user of the PCD as being within a defined distance away (e.g., 3 miles) from the PCD's location and/or the location of the PCD's point of access to the network.

With reference now to the figures, FIG. 3 illustrates an example client-server network with the client represented by PCD 310 or cell phone 350, according to the illustrative embodiment. Network 300 comprises a network backbone (or infrastructure) 312 to which is coupled an LICR server 315 and a plurality of distributed web servers, of which web server 305 is shown.

Network 300 represents a distributed server system. The network infrastructure 312 may comprise a wired network, a wireless network or a combination of wired and wireless networks. For example, the network infrastructure 312 may be a standard "wired" Ethernet network which connects each of multiple web servers (305). Network infrastructure 312 may also be a wireless network based on IEEE 802.11 or other wireless protocol. Network infrastructure 312 is illustrated connected to Internet 325. It is appreciated that network infrastructure 312 may form part of the Internet 325, or may couple to other networks, e.g., other local or wide area networks, such as the Internet 325.

As provided below, LICR server 315 is accessible to any PCD 310 connected to network 300, whether directly connected via an ISP to the Internet 325 or indirectly connected via a web server's access point gateway 307. Additionally, LICR server 315 is also accessible to any mobile communication device (cellular phone) 350 connected via a wireless network 360, which is in turn connected to network 300. Mobile communication device 350 transmit wireless communication to a base station (having an antenna 355 and mobile station controller (MSC) 357), and base station relays that wireless communication through wireless network 350. LICR server 315 is a primary source of location specific content/services/information that may be retrieved by a request by a PCD connected to network 300. LICR server 315 has an associated database 370, which stores location-specific content and other information/data utilized to perform the various server-level functions of the described embodiments.

As shown, network 300 includes network distribution unit (NDU) or access device 307, associated with web server 305, to which PCDs 310 connect. PCDs 310 may connect to access devices 307 via wireless and/or wired connection. Examples of possible wireless connection include CDMA, FDMA, and TDMA (all multiple access schemes). These access devices enable a mobile user with a personal computing device (PCD) to gain access to network services, such as Internet access, or to other web servable content hosted on a server of the distributed network.

Access devices may be provided as either wireless access points, which implement the 802.11 Wireless Ethernet protocol ("WiFi"), or hardwired Ethernet connection ports. It is appreciated that a plurality of access devices (or NDUs) 307 may be widely distributed in various facilities, such as airports, mass-transit stations, shopping malls, restaurants and other businesses, such as business offices, law firm offices, retail stores, hotels, and the like, to enable PCDs to connect to the network and primarily the Internet 325 from a plurality of different locations. Each access device has an associated IP address and/or Media Access Control (MAC) address.

One or more internet service providers (ISPs) 330 or general content providers may also provide PCDs 310B with direct access to the Internet 325 (via local NDUs). ISP 330 is a network server coupled directly to the Internet 125. ISP 330 may include one or more servers configured/programmed to provide various goods, information, and/or services as appropriate for the service provider. Each NDU of ISP 300 also has an associated IP address and/or MAC address.

Network 300 may provide information and/or services to the attached/connected PCDs 310 and/or phone 350 based, at least partly, on the known geographic location of the PCDs 310, e.g., as indicated by geographic information (e.g., GPS information) provided from the PCD 310. Notably, unlike previous implementations, which rely primarily on the locations of the NDU/access points 307, the geographic/location-based services of network 300 are provided by a novel configuration of PCD 310 (or phone 350) and the use of LICR server 315, regardless of, or in addition to, the location-based information that may be provided by the web servers 305 when the PCD connects to a known access points 307, during the initial connection process.

Turning now to FIG. 4A, there is illustrated an example data processing system that may operate as one of PCDs 310. As utilized herein, the term PCD means any one or various types of devices, including a computer system, such as a portable computer, a personal digital assistant (PDA), an Internet appliance, a gaming device, a communications device, such as a cellular phone, digital wireless telephone or other wired or wireless device. For simplicity, the system is described generally as PCD 310, and the specific application of functions within PCD 310 are determined by the software program (code) executing on processor(s) of PCD 310. The configuration of PCD in FIG. 4A generally applies to computer based devices. FIG. 4B illustrates a different configuration of a PCD when the PCD is a mobile communication device, such as a cellular phone.

As shown by FIG. 4A, PCD 310 comprises a central processing unit 410 coupled via system bus (interconnect) 415 to memory 420 and input/output (I/O) controller 430. I/O controller 430 operates as a control point for various input and output devices, of which pointing device (mouse) 432, keyboard 434 and display 436 are illustrated. These I/O devices enable a user of PCD 310 to enter input, respond to request for location information, and view location-specific content (including local maps), as described below.

Figure 1:
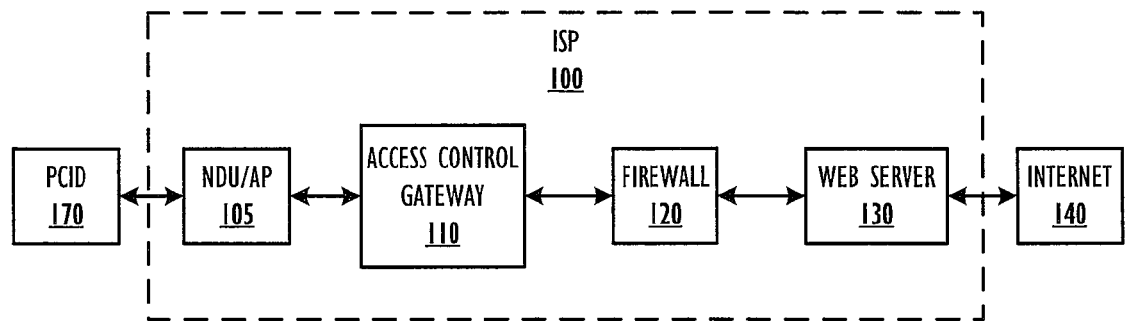
FIG. 1 illustrates a prior art representation of components involved in completing an initial connection process between a personal computing device (PCD) and the Internet via an Internet Service Provider (ISP) gateway and web server.
Figure 2:
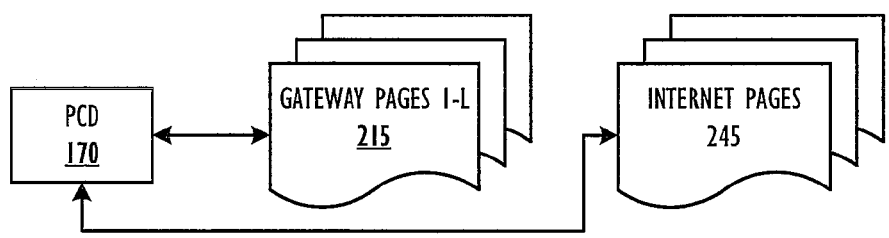
FIG. 2 illustrates a presentation of gateway pages during the initial connection process by a PCD before providing access to the Internet pages, according to the prior art.

Also coupled to system bus 415 are network interface controller (NIC) 450 and (optionally a) global positioning system (GPS) receiver 455. NIC 450 enables PCD 310 to connect to server network 312 or Internet 325 via access points 307 and/or ISP 330 (FIG. 1). Depending on implementation, NIC 450 may be a wireless device or wired device. GPS receiver 455 enables real-time determination of the geographic location (or GPS location) of PCD 310. As described below, in one embodiment, this location is provided to an executing utility, which forwards the location as a part of location parameters transmitted from PCD when PCD is connected to the network 300 or specifically to the Internet 325.

PCD 310 also comprises other storage 460, which is illustrated coupled to system bus 415. According to the described embodiments, storage 460 includes thereon instructions/code/data that is loaded into memory 420 and utilized for/during execution of programs and/or utilities by PCD 310. Notably, storage 460 stores GPS location 456, PCD identifier (ID) 457 and PCD's (or NDUs) IP address 458 and MAC address 459, which data are utilized as parts of the location parameters transmitted to LICR server to initiate/trigger retrieval of location-specific content.

In addition to the above described hardware components of PCD 310, several of the functional features of the invention are provided via software components (i.e., functional program code or utility) executing on CPU 410 of PCD 310. Thus, as illustrated, located within memory 420 are a number of software components or utilities, including: (a) operating system 421, which provides the Internet Protocol (IP) parameters for network connection and communication; (b) browser 423, which enables PCD 310 to access and retrieve content from the Internet 325, using hypertext transfer protocol (http), secure http (https), file transfer protocol (FTP), universal data protocol (udp), and/or other industry standard protocols; (c) location-specific content retrieval (LSCR) utility 425; and (d) mapping utility 427. The latter of the two utilities and associated functional features are described in greater detail below.

As introduced above, OS 421 provides the various operational parameters to enable general operation of PCD 310. OS 421 in conjunction with web browser 423 provide the IP (and HTTP) functionality required for network access and transfer of information over the networks. The two components farther enable the various processes by which (a) connection is established by a PCD 310 to server 305 via an AP (307) or to Internet 325 via ISP 330 and (b) authentication, login, and other functional features of the access processes and other general web browser processing are enabled/provided.

In implementation, many of the novel processes supported by the above four software components are provided as a seamless operation via a single execution of code. Also, for simplicity in describing the invention, and as a preferred embodiment, the collective body of code that performs the various functions described herein and/or the described features of the illustrative embodiments (including all functions of LSCR utility 425 and mapping utility 427) are collectively referred to hereinafter as LSCR utility 425. References to LSCR utility (or execution thereof) thus cover the entire range of location specific content retrieval functions provided by the illustrative embodiments, which occur at the PCD 310. As described herein, LSCR utility 425 is downloaded to PCD 310 as an upgrade to web browser functionality, and LSCR utility 425 is activated and functions in a seamless manner during operation/execution of web browser.

The LSCR utility 425 executes on CPU 410 and provides a series of functional processes, which are illustrated and described below within the description of FIG. 8. Generally, LSCR utility 425 provides the method functions of: (1) detecting an initial connection of the PCD to a network from which a LICR server is accessible; (2) generating and transmitting the PCD's location parameters to the LICR server; (3) receiving and providing location specific content/information/services to the PCD's web browser; and (4) prompting for entry of additional location identifying information (in additional to the PCD location parameters) when requested from the LICR server. Other functions are also supported as described herein and within the flow chart of FIG. 8.

FIG. 4B is a block diagram representation of an example communication device (360), configured with the functional capabilities required to enable location based applications, in accordance with the following described embodiments of the invention. According to the illustrative embodiment, communication device 350 is a cellular/mobile phone. However, it is understood that the functions of the invention are applicable to other types of communication devices and that the illustration of communication device 350 and description thereof as a mobile phone is provided solely for illustration. For example, communication device may be a personal digital assistant (PDA), a Blackberry™, an Ipod®, iPhone®, or other similar potable device with the functionality to support location based content retrieval and display. Similarly, while described as a portable or mobile device, the communication device 350 may also be a non-portable (e.g., desktop phone or vehicle-integrated car phone) with similar functionality as that of PCD 310 of FIG. 4A.

Returning now to FIG. 4B, communication device 350 comprises central controller 405 which is connected to memory 421 and which controls the communications operations of communication device 350. Included among these operations are the generation, transmission, reception, and decoding of speech and data signals. As illustrated, controller 405 comprises digital signal processor (DSP) 406, which handles the receipt and transmission of analog and/or digital signals. Controller 405 also comprises programmable microprocessor 407, which controls the overall functions of communication device 350. While shown as separate components, it is understood that both functionality provided by both components may be integrated into a single component. It is further appreciated that the functions of both components operate in concert, where necessary, to provide the speech communication (and dual-channel adaptive noise cancellation) features of communication device 350.

Communication device 350 also comprises input devices, of which keypad 437 and microphone (mic) 431 are illustrated, connected to controller 405. Additionally, communication device 350 comprises output devices, including speaker 433 and optional display 435, both also connected to controller 405. The described input and output devices allow for user interfacing with communication device 350.

In addition to the above components, communication device 350 farther includes transceiver 470, which is connected to antenna 475. Transceiver 470, in combination with antenna 475, enable communication device 350 to transmit and receive wireless radio frequency (RF) signals from and to communication device 350. Transceiver 470 includes an RF modulator/demodulator circuit (not shown) that generates and deciphers/converts the RF signals.

Communication device 350 may be a GSM phone and include a Subscriber Identity Module (SIM) card adapter 461. SIM card adapter 461 couples SIM card 465 to controller 405. SIM card 465 may be utilized as a storage device for storing specific user profile data of the particular user to whom SIM card 465 is associated. In a preferred embodiment, communication device 350 is a dual mode device, capable of communicating via wireless cellular communication and wireless IP (Internet Protocol) communication. When communication device 350 is used, connection to network may be completed via wireless communication using cellular, digital, or infrared communication technologies, among others.

Those of ordinary skill in the art will appreciate that the hardware depicted in FIG. 4B may vary depending on implementation. Thus, the depicted example is meant solely for illustration and is not meant to imply architectural limitations with respect to the present invention.

As with PCD 310 of FIG. 4A, in addition to the above hardware components, several functions of communication device 350 and specific features of the invention may be provided as programmable code or logic, which is stored within memory 421 and executed by microprocessor 407 (or DSP 406) within controller 405. The combination of code and/or logic that collectively provides the functional features of the described embodiments is referred to herein as LSCR utility 425, which has been previously described with reference to FIG. 4A.

FIG. 5 illustrates an example LICR server, according to one embodiment. As described herein, the system is described generally as location identifier and content retrieval (LICR) server 315, and the specific application of functions within LICR server 315 are determined by the software program (code) executing on processor(s) of server 315. In one embodiment, LICR server is a standard server on the network with normal server functions and which is programmed with a LICR utility, while in an alternate embodiment, the LICR server is a specialized server added to the network to provide the specific functions of the LICR utility.

As shown, server 315 comprises a central processing unit 510 coupled via system bus (interconnect) 515 to memory 520 and input/output (I/O) controller 530. I/O controller 530 operates as a control point for various input and output devices, generally represented as I/O devices 535. These I/O devices enable an administrator of LICR server 315 to (locally) load and/or change servable content and/or other information, stored in persistent storage (570) of server 315.

Server 315 also comprises other storage 570, which is illustrated coupled to system bus 515. According to the described embodiments, storage 570 includes thereon several databases, including IP-to-location database 572 (which enables a look up of a specific geographic location based on the known IP address of the point at which the PCD connects to the network), Media Access Control (MAC) database, 573 (which uses the MAC address of the NDU 307 to look up the position of the user), user profile database 574 (which enables setting of user preferences and selections of types/categories of content that the user of the PCD desires to be returned to the PCD), and location content database 576 (which provides the general list of selectable content available across a plurality of user locations, which may be selectively returned to the PCD based on the PCD's location and/or user preferences). The illustrative embodiment provides for a locally-connected storage 570; However, storage 570 and, by illustration, the various databases (572, 574, 576) may be located remotely from server 315 (perhaps accessible via a network), in other embodiments.

These databases provide specific information that is utilized by server 315 to complete the server-level location-specific features described herein. In one embodiment, for example, user profile database 574 maintains demographic information of users (who may be registered with LICR server 315), utilized to determine preferences for types of location specific content from the general content that are retrieved and returned to the user's PCD. Examples of demographic information includes, but is not limited to, information such as: name, online name/identity, address, contact information such as telephone number(s) and email address, daily schedule, family members, hobbies/activities, sports, past purchases, spending habits, buying preferences, hotel preferences, restaurant preferences, rental car preferences, banking, memberships (e.g., airline reward memberships), associations, past activities, and the like. One or more of these various, demographic information may then be utilized to filter a search for location specific content that is returned to the user's PCD at specific locations.

Also coupled to system bus 515 are network interface controller (NIC) 550 by which server 315 connects to/communicates with other devices (e.g., PCD 310) via a network (e.g., network 312 or Internet 325).

In addition to the above described hardware (and database-type) components of server 315, several of the functional features of the invention are provided via software components (i.e., functional program code or utility) executing on CPU 510 of server 315. Thus, as illustrated, located within memory 520 are a number of other software components or utilities, including: (a) operating system 521, which provides the Internet Protocol (IP) parameters for network connection and communication; (b) network server protocols 523, which enables server 315 to operate as a network server and communicate with PCDs over network 300 (FIG. 3); (c) location identification and content retrieval (LICR) utility 525; and (d) map generation utility 527. In an alternate embodiment, functions of the map generation utility 527 may be provided within LICR utility 525, rather than as a separate utility. This embodiment is the one that is described herein.

As introduced above, OS 521 provides the various operational parameters to enable general operation of server 315. OS 521 in conjunction with server protocols 523 provide the IP (and HTTP) functionality required for network access and transfer of information over the various networks. Those two components in conjunction with LICR utility 525 enable the various processes by which (a) location identifying information is received from a PCD (310) and evaluated by server 315 to identify the PCD's location and (b) location-specific content/services are provided to PCD 310 from server 315 perhaps following authentication, login, and/or other activation features.

In implementation, many of the novel processes supported by the above four software components are provided as a seamless operation via a single execution of code. For simplicity in describing the invention and as an alternate embodiment, the collective body of code that performs the various server-level functions described herein and/or the described features of the illustrative embodiments is referred to hereinafter as LICR utility 525. References to LICR utility (or execution thereof) thus cover the entire range of functions that occur at the LICR server 315, as provided by the illustrative embodiments. The LICR utility 525 executes on CPU 510 and provides a series of functional processes, which are illustrated and described below within the description of the flowchart of FIG. 9. Generally, LICR utility 525 provides the method functions of: (1) receiving PCD location parameters from a PCD connected via the network; (2) identifying a location of the PCD from the received location information; (3) retrieving a customer profile (or preferences) associated with the PCD; (4) retrieving specific content associated with the identified location that is relevant to the customer preferences; (5) generating a map indicating the specific locations of services and other content relative to the PCD; and (6) forwarding the specific location-based content (and the associated map thereof) to the PCD. Additional functions may also be provided by LICR utility 525, some of which are described within the flow chart of FIG. 9.

FIG. 6 illustrates an example information exchange between an application (i.e., LSCR utility 425) within PCD 310 and components of LICR server 315, namely location identification component 525A and application server component 525B (i.e., functions of LICR utility 525). As shown, PCD 310 also comprises local data cache (storage 460) for storing retrieved location-specific content and location identifying parameters. Components 525A and 525B connect to and retrieve information from one of two types of information databases, namely, customer information (or profile) database (574) and location information (or content) database (576). This interaction/exchange of information between PCD component(s) and LICR sever components enable the functional features of the embodiments described herein.

With the above configuration of PCD 310 (FIG. 4) and server 315 (FIG. 5) and interconnectivity of functional components of both devices as shown by FIG. 6, location-specific content is provided to the PCD 310 using information retrieved from LICR server 315 without requiring specific access points, gateways, or access web servers. That is, the various described embodiments of the present invention circumvent/overcomes the limitations of providing location-based content only during an initial connection process at an access point gateway (FIG. 1). According to the described embodiments, the application/utility (425) for providing location specific services is placed on the PCD rather than on the access gateway. The engine/utility may be a stand-alone client program, or in an alternate implementation, the engine/utility may be a browser plug-in using Java, Flash, Active-X plugin, or similar web-browser plug-in technology.

Upon connection to the Internet (or network on which the LICR server is accessible), the utility (425) retrieves the access point's IP address and communicates with the LICR server 315. According to one embodiment, the utility communicates PCD location parameters, such as the device's IP address, device/user identification (ID) and profile (preferences), which are stored in local data cache (460) of the PCD 310. The LICR server 315 examines the location information (e.g., the IP address of the PCD connection to the network/Internet) and performs a lookup of that location information (IP address) against known locations in the server's location information database (572). The LICR server 315 also accesses the customer information database 574.

Figure 7:
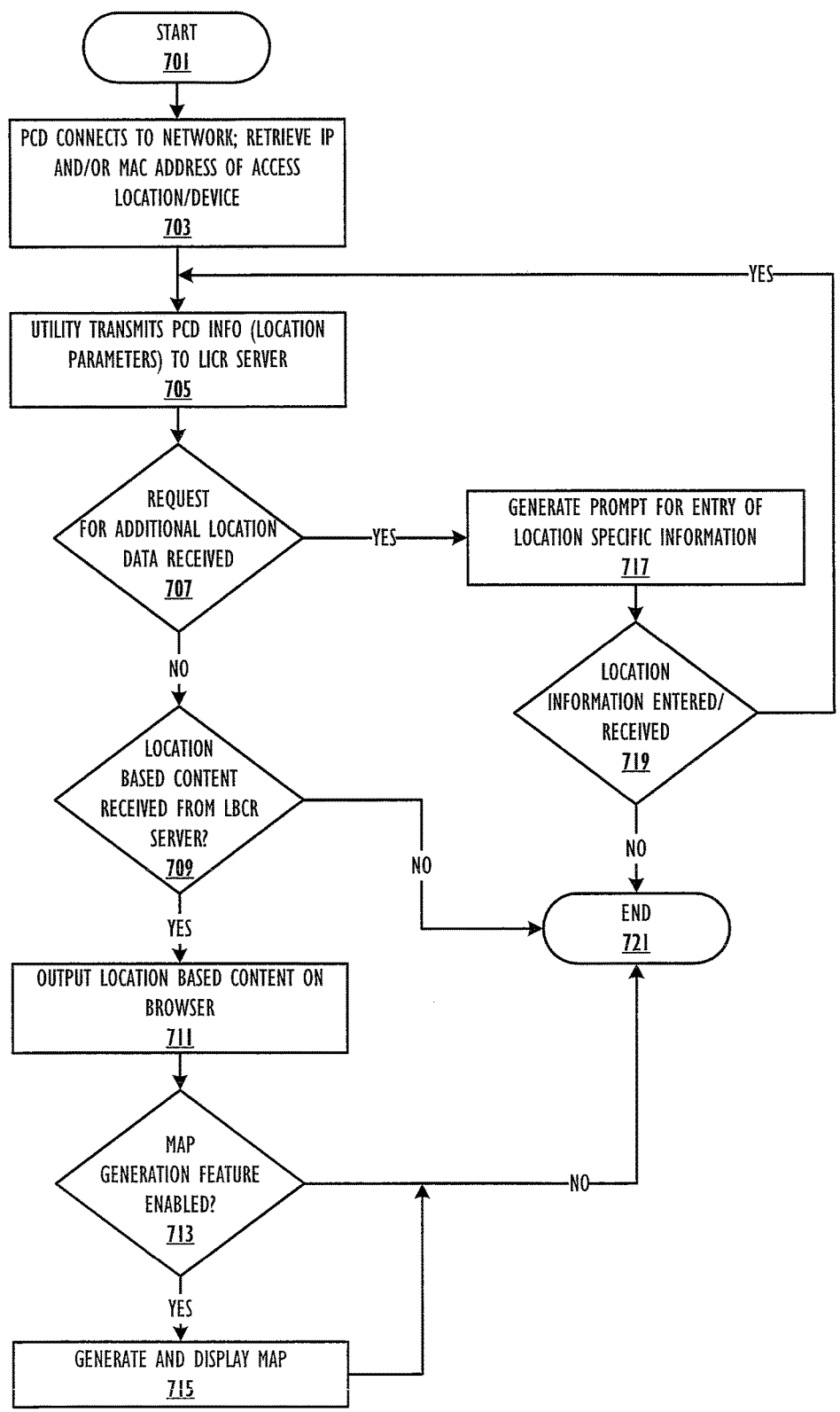
FIG. 7 is a high-level flow diagram of the method by which the PCD configured according to FIG. 4 triggers a retrieval of location-specific content from a LICR server to which the PCD is connected, in accordance with one embodiment of the invention.

Turning now to the flow charts, FIG. 7 illustrates the method by which the PCD-level processes of the invention are implemented, according to one embodiment. FIG. 9 then illustrates the method by which the server-level processes of the invention are implemented. Specifically, while the invention may be implemented without an explicit "new" utility controlling the processes (i.e., implemented via an enhancement to an existing application or utility), the processes illustrated by FIGS. 7 and 9 are assumed to be completed by LSCR utility 425 and LICR utility 525, respectively. With respect to FIG. 8, LSCR utility 425 executes on PCD 310 whenever web browser of PCD 310 detects that PCD 310 is coupled to a network (300) over which the LICR server 315 is known to be accessible, according to the illustrated embodiments. LIBC utility executes whenever a PCD transmits to the LICR server a request for location-specific content or a simple notification of receipt of the PCD's location parameters. Although the methods illustrated in FIGS. 7 and 9 may be described with reference to components/devices shown in FIGS. 3-6, it should be understood that this is merely for convenience and alternative components/devices and/or configurations thereof can be employed, when implementing the methods.

The PCD-level process of FIG. 7 begins at block 701, and proceeds to block 703 at which the PCD connects to the network and retrieves IP and/or MAC address information from the access location/device, such as an NDU. In an alternate implementation, the IP/MAC address of the NDU is stored within PCD and updated as PCD changes access location. The LSCR utility is activated (perhaps when a web browser is opened on PCD) and transmits PCD location parameters to LICR server, as shown at block 705. The LSCR utility is pre-programmed with the IP address of the LICR server on the network. Thus when the network connection is detected, the PCD location parameters (comprising one or more of the IP address of the connection point to the network, the MAC address of the NDU 307, the GPS coordinates of the PCD, the IP address of the PCD, the PCD user profile/preferences, among others) are automatically transmitted to that IP address.

As indicated above, the PCD location may be determined by the IP address of the access point to which the PCD connects to the network/Internet. Once the LSCR utility is provided the location (e.g., geographic) information, the application can transmit that information to the LICR server 315 that provides location-based services.

In one embodiment, the location information received by the PCD is an RFC-1918 private address that is translated. When this occurs, a lookup engine within LSCR utility examines the WAN IP address of the access location. If the IP address is a public address, the LSCR utility (PCD application) examines the sub-net (e.g. via ARP), and transmits the IP block information for the location to the LICR server. In addition the MAC address of the NDU 307 is transmitted for lookup in MAC-to-location database 573, or used in a local cache lookup in location content database 576.

Following the transmittal of the PCD location parameters, a determination is made at step 707 whether a request is received from the LICR server for additional location information about the PCD's location. When such a request is received, the utility generates a prompt at block 717 for entry by the PCD's user of specific location information that would enable the LICR server to determine the location of the PCD. In one embodiment, the user may override the detected/default parameters with location ID of a different location of interest to the user (e.g., a destination to which the user will be traveling, where the user does not desire to wait until the user arrives at the location and establishes a network/Internet connection at that location in order to retrieve the location specific content).

From block 717, a next determination is made at block 719 whether the requested location information is received. If the information is not received (perhaps within a preset timeout period), the process ends at termination block 721, without location-specific content being retrieved. If the requested information is received, the process returns to block 705 at which the entered information is transmitted to the LICR server.

Returning to decision block 707, assuming no request is received for additional information, a next determination is made at block 709 whether location specific content is received from the LICR server. If the information is not received (perhaps within a preset timeout period), the process ends at block 721, without location specific content being retrieved. However, assuming the information is received, the received information is outputted on the web browser, as shown at block 711. A determination is made at block 713 whether a map generation feature is provided/enabled for the received location information. If a map generation feature is provided/enabled, a map of the relevant information (e.g., services) in the surrounding location is generated and displayed, as shown at block 715. Then, the process ends at block 721.

Figure 8:
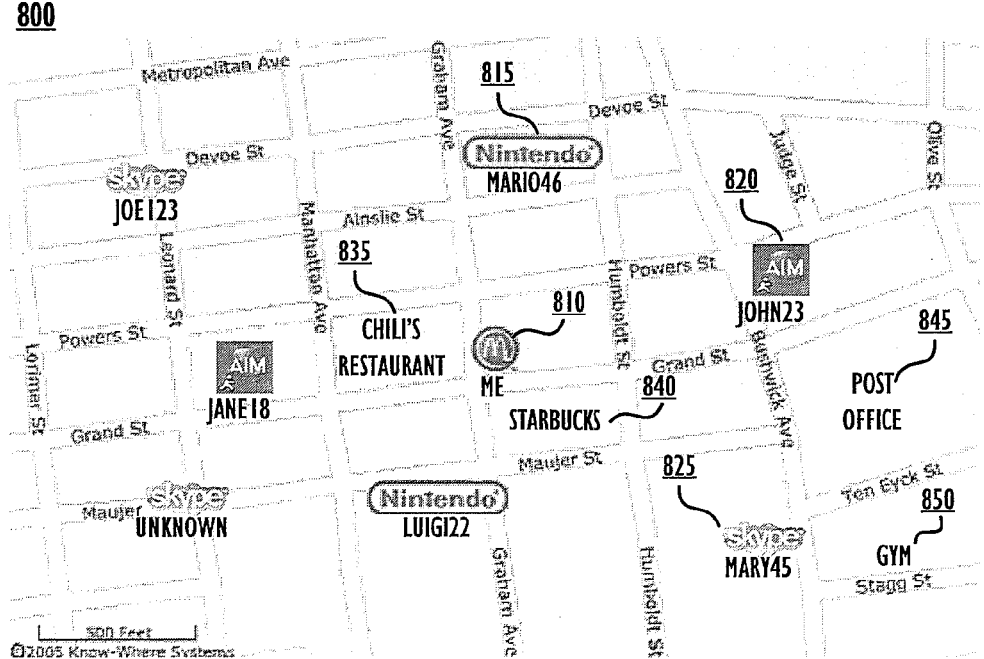
FIG. 8 illustrates an example street map, with location-specific information that may be accessed/retrieved by the PCD from a LICR server, in accordance with one embodiment of the invention.
Figure 9:
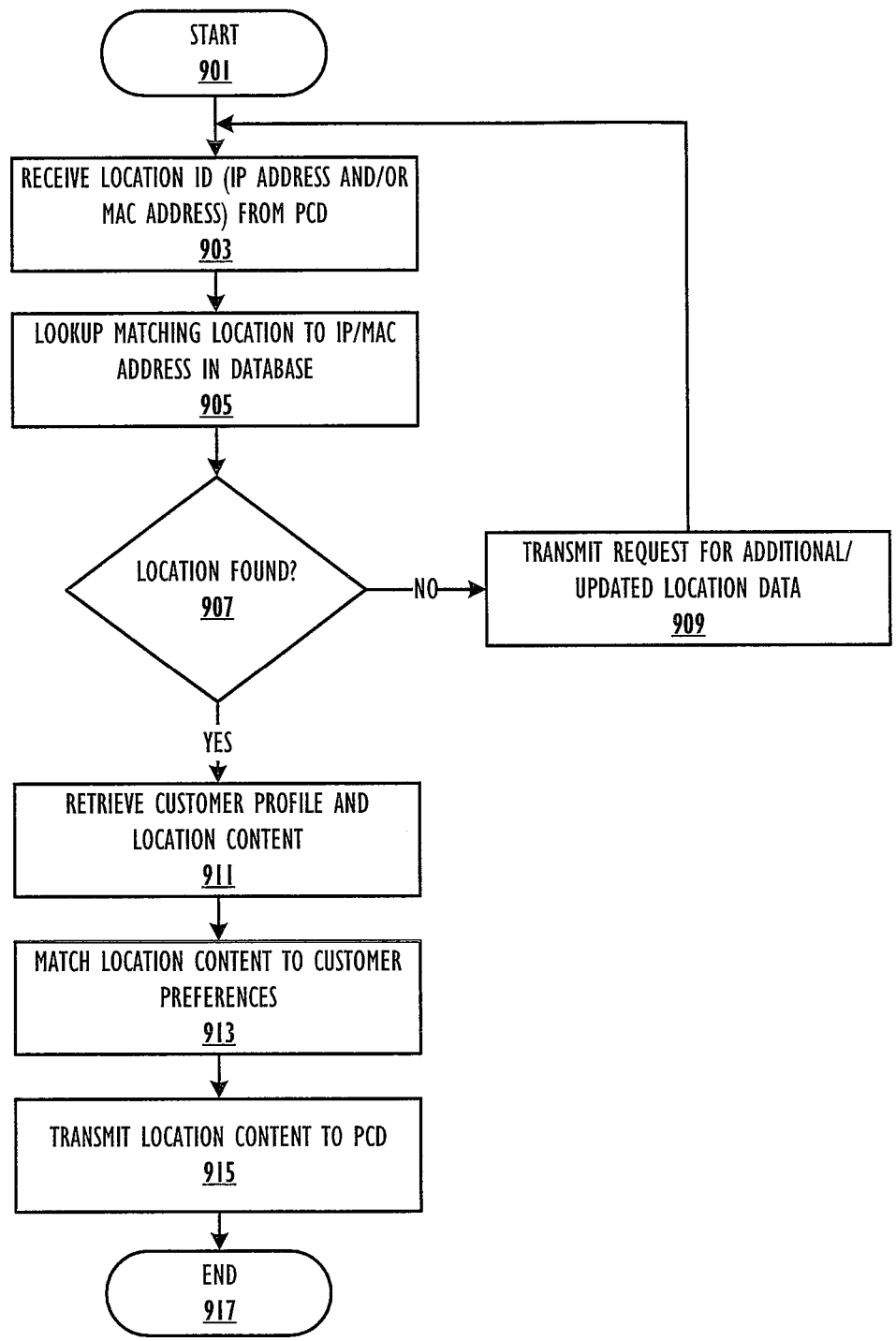
FIG. 9 is a high-level flow diagram of the method by which the LICR server responds to a request for location-specific content from a PCD, in accordance with one embodiment of the invention.

As stated previously, the location specific information returned from LICR server may include a map, such as map 800 of FIG. 8. Map 800 is created and provided by one of mapping utility 427 of server or mapping utility 527 of PCD. In the former implementation, the information is provided and mapping utility 427 then represents the information on map 800. The information within map 800 may be granularly presented, as timed information that is presented at different times following initial identification of the PCD and the PCD's location.

By way of example, FIG. 8 provides a map 800, with the PCD location 810 indicated as "me". Surrounding the PCD location 810 are demarcations of streets and businesses/services, including restaurant (Chili's) 835, coffee shop (Starbucks) 840, post office 845, and gym 850. Also illustrated are icons providing examples of other application types at which specific users (indicated by the users' screen names) are connected to network. These application icons include Nintendo 815, and AOL IM 820, and Skype 825.

As provided, the mapping feature enables location of other users to be displayed and shown on a local map or diagram. This feature could be utilized, for example, in gaming wherein Internet-based game enthusiasts may connect to the Internet and wish to know if they are playing a game with someone down the block or at a different location. The LICR server stores information about currently connected PCDs and the corresponding PCD locations, and the LICR server transmits that information back to the PCD so that the relative locations are provided. For example, a game enthusiast may be able to browse how many people there are in the neighborhood who are connected and ready to play. As another example, if a user is using a chat program or a VOIP service such as Skype™, the user may wish to see if a person is connected in the user's local neighborhood and arrange for a face-to-face meeting. In other examples, the PCD user may be interested in viewing which other users within the location is online, using instant messaging such as AOL IM, Microsoft Messenger, and Jabber.

In yet another embodiment, the information provided from the LICR server may include a table, which provides a list of PCDs (or users) and associated user applications. Table I below illustrates an example table of information that may be provided to the PCD by LICR server. As shown by the table, among the information that is provided are distance, user, city, and application type. Alternatively, as shown by FIG. 8, a more sophisticated map can be displayed with the various user locations, screen names, and application types.

TABLE I

| User | Street Location | City | Distance (Mi) | application |
| --- | --- | --- | --- | --- |
| me | 321 Grand Street | New York | 0 | Skype |
| mary45 | 235 Bushwick Ave | New York | 0.2 | Skype |
| mario46 | 228 Ainslie St. | New York | 0.15 | NintendoDS |
| john23 | 188 Powers St. | New York | 0.1 | AOL IM |

Turning now to FIG. 9, the server-level process begins at block 901 and proceeds to block 903 at which LICR server receives the PCD location parameters from the PCD. At block 905, the server utilizes the received PCD location parameters to look up a matching location to the IP address (or GPS coordinates) from IP-to-location database 572 (FIG. 5) or to MAC address from the MAC-to-location database 573. Depending on the information provided from the PCD, there may be some additional processing required for completing the location lookup process. At block 907, the utility determines if the matching location is found, and if not, the utility generates and transmits a request/signal to the PCD for additional location information data, as shown at block 909.

Thus, in one implementation, the LICR utility on the LICR server utilizes the IP address to look up the location information by matching the IP address information with the known location information in the location database (572), as described below. The LICR server 315 then transmits the location information back to the LSCR utility so that the LSCR utility knows the geographic location of the customer using the PCD, and this information is stored in the PCD's local cache.

A location information editing tool is provided to the PCD user as a function of the LSCR and/or LICR utility to assist in initially populating and editing the user profile information (e.g., preferences) and update PCD (and/or NDU) location information. The IP addresses may change for certain locations over time, so a system and method must be available to populate the initial database with the IP-to-location information and/or MAC-to-location information, detect if IP addresses have changed, and edit the IP-to-location information and/or MAC-to-location information if the information is incorrect.

To facilitate checking, the machine (MAC) address and/or the IP address of the NDU (or Access Point) for the connection to the Internet can be transmitted to the LICR server. Matching of the MAC address to the location within the MAC-to-location database can be used for checking the information. If other information is available on the PCD, such as GPS information, this information can be transmitted as well and compared with previous entries. If the MAC/IP mapping or GPS information does not match previous entries within the location database(s), an error may be triggered in the location database to check the location information and correct that information. A signal is thus generated and transmitted back to the requesting PCD to trigger a prompt for that information from the PCD's user. The PCD user then provides a response with the location information, or alternatively, if the PCD has a GPS receiver and/or other location finding mechanism, the utility may dynamically respond to such a request with the location information, which is then matched to the IP address and/or MAC address received with the location information by the LICR server. This match is then stored as an update to the appropriate one of the LICR server's databases. When a user input is provided, the input may include specific information such as a street address, zip code, business name (e.g., McDonalds), points of interest within the vicinity of the location, among other information. Users are thus able to assist in populating the LICR server's databases (with site information) for later retrieval of relevant location-specific information by the users themselves or other users at the particular location.

In one embodiment, an initial set of location-specific data as well as the IP-to-location and MAC-to-location information (for NDUs, for example) are provided within the location database, which also receives subsequent (or periodic) updates of and addition to the information within the location database. Also, user profiles are populated within the user profile database by PCD users when the LSCR utility is executed on the PCD. As the database becomes more and more populated with location-specific information, user profiles, and new and updated location identifying parameters (IP address matches and MAC address matches), the ability of the PCD and/or the LICR server to provide more accurate, location-specific and user-specific information increases.

In addition to the ability to edit/update a location, the LICR utility also provides the functionality by which a PCD user is able to set up and modify/maintain a user profile within user profile database 574 (FIG. 5). Within this database (574), the user is able to enter a profile including preferences, such as an indication that the user likes "basketball", "pizza", and "Jazz", for example. Entry of these specific preferences would allow advertisements, special events or local points of interest to be directed to the user. Also, the user may wish to utilize an online identity (nickname, screen name or a "handle") where such identifying data is displayed within location information, such as illustrated by the map of FIG. 7. Additionally, the user may enter preferences of whether the user should be visible to others or not for various applications or protocols, and the user may have different online identities for different applications or select to only have their online presence shown to a certain select group or groups of other users rather than to everyone. These features are made available for modification by a user utilizing the LSCR utility and/or LICR utility executing a user profile manager function. Thus, rather than simply receiving a list of all the general content at an identified location, one embodiment enables the customer to enter information at the PCD that is transmitted to the database of customer information (user profile database 574) of the LICR server and which serves to filter out content that is not relevant to or desired by the PCD user.

In another embodiment, LSCR utility may support real time entry of queries for specific types of content to retrieve from the LICR server. Examples of customer desired services that may be provided in this manner are: Local advertising, local maps, local contact information, local businesses, local weather, local points of interest etc. This information can be provided with local business or services to enable the customer to enter a query like "show me ATM machines near me," and the LICR server can respond to the PCD with a list of locations, addresses, and distances. This information may be displayed in a convenient map or diagram (as provided by FIG. 7) showing the locations in reference to the location that the PCD is at.

Returning now to FIG. 9, if the matching location is found, the utility retrieves the customer profile (from user profile database 574) and the corresponding location content (from location content database 576), as provided at block 911. The utility matches the customer's preferences (and other information within the profile) against the larger collection of content and selects the appropriate location content from the larger collection of location content based on the information within the customer profile, as shown at block 913. In one embodiment, the PCD (or PCD user) registers with the LICR server at some prior time and provides specific information about the type of content that the user of the PCD would be interested in (i.e., preferences). These preferences are stored within the customer profile, identified by the user's login name and/or the PCD's MAC address or other unique ID. One implementation may involve the user preferences being entered at the PCD during set up of the LSCR utility on the PCD. This information may then be forwarded to the LICR server within the PCD location parameters to filter the larger set of location specific information that is retrieved and return only relevant (user-desired) content to the PCD.

Returning to the flow chart, once the location specific content is identified and selected/retrieved from the location content database and filtered (where appropriate), the LICR utility transmits the content to the PCD (or the PCD IP address), as shown at block 915. Notably, the information may be forwarded as HTTP information that is displayed within the web browser on the PCD's display. The process then ends at block 917.

In the flow charts above, one or more of the methods are embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the methods' steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

There are many location-based services that are desirable to be provided to customers that connect to the Internet at various distributed locations. These services may include advertising, directions, special offers, content, communication aides, local payment, and similar services. The location-based services of the described embodiments rely on a PCD enabled to communicate with a LICR server (having location identification functionality and location content retrieval functionality) without requiring any interaction with an access control gateway. Thus, as provided by the above described embodiments, location specific information is provided to a PCD independent of the ISP and the access control gateway. The embodiments provide a system and method that enables location based services to be provided at any location that has Internet access, regardless of the type or manner of access. The above description provides exemplary embodiments for implementing the novel features of the invention. Alternate embodiments are also possible, including variations of and modifications to the above described illustrative embodiments.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, SRAM, DRAM, Flash memory, etc., thereby making an article of manufacture in accordance with the invention. The article of manufacture containing the programming code is used by either executing the code directly from the storage device, by copying the code from the storage device into another storage device such as a hard disk, RAM, etc. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media, include recordable type (tangible) media such as floppy disks, thumb drives, hard disk drives, CD ROMs, and DVDs.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

While the invention has been particularly shown and described with reference to a preferred embodiment, it will be understood by those skilled in the art that various changes in form and detail may be made therein without departing from the spirit and scope of the invention.

The invention claimed is:

1. A method comprising:
   detecting, by a computing device, a connection that provides the computing device internet access;
   executing a location-based content retrieval application at the computing device to transmit location information associated with the computing device to a location server and receive location-based content from the location server in response to the location information; and
   generating a display output based on the location-based content, the display output including a map and an indicator, wherein the map identifies a location of a second computing device that is located proximate to the computing device, and wherein the indicator identifies an application of the second computing device.

2. The method of claim 1, wherein the indicator includes a screen name assigned to a particular user associated with the second computing device.

3. The method of claim 1, further comprising:
   generating a prompt for additional data; and
   responsive to the prompt, receiving the additional data via user input at the computing device.

4. The method of claim 1, wherein the location-based content comprises advertising.

5. The method of claim 1, wherein the indicator identifies that a screen name assigned to a particular user associated with the second computing device is not included in the location-based content.

6. The method of claim 1, wherein the map identifies a particular location of the computing device.

7. The method of claim 1, wherein the map includes the indicator.

8. The method of claim 1, further comprising:
receiving user input at the computing device, the user input indicating a user preference; and
transmitting the user preference to the location server, wherein the location-based content is identified based at least in part on the user preference.

9. The method of claim 8, wherein the user preference includes a restaurant preference indicating a particular restaurant, and wherein the location-based content includes advertising for the particular restaurant.

10. The method of claim 1, wherein the indicator identifies a position on the map corresponding to the location of the second computing device.

11. The method of claim 1, wherein the indication includes an icon associated with the application.

12. The method of claim 1, wherein the location-based content retrieval application comprises a plug-in of a browser, wherein the plug-in is configured to retrieve and display the location-based content in the browser in conjunction with internet content independent of an internet service provider that provides the internet content.

13. The method of claim 12, wherein the plug-in is configured to be automatically executed by the computing device responsive to opening of the browser.

14. The method of claim 1, wherein the location information comprises a network address of an access point.

15. The method of claim 14, wherein executing the location-based content retrieval application further comprises retrieving the network address of the access point from the access point and sending the network address of the access point to the location server.

16. The method of claim 14, wherein executing the location-based content retrieval application further comprises retrieving the network address of the access point from a memory of the computing device and sending the network address of the access point to the location server.

17. The method of claim 14, wherein the network address of the access point comprises a media access control address of the access point.

18. The method of claim 14, wherein the network address of the access point comprises an internet protocol address of the access point.

19. The method of claim 18, wherein executing the location-based content retrieval application further comprises:
receiving a private internet protocol address of the access point; and
transmitting internet protocol block information associated with a wide area network internet protocol address of the access point to the location server.

20. The method of claim 1, wherein executing the location-based content retrieval application further comprises:
receiving, at the computing device, user input representing a query for a particular type of location-based content;
transmitting the query from the computing device to the location server; and
receiving the particular type of location-based content from the location server.

21. The method of claim 20, wherein the particular type of location-based content is identified based at least in part on a user preference transmitted to the location server.

22. A computer-readable storage device comprising instructions that, when executed by a processor, cause the processor to perform operations comprising:
detecting a first connection that provides the computing device internet access;
executing a location-based content retrieval application at the computing device to transmit location information associated with the computing device to a location server and receive location-based content from the location server in response to the location information; and
generating a display output based on the location-based content, the display output including a map and an indicator, wherein the map identifies a location of a second computing device that is located proximate to the computing device, and wherein the indicator identifies an application of the second computing device.

23. An apparatus comprising:
a processor; and
a memory comprising instructions that, when executed by the processor, cause the processor to perform operations comprising:
detecting a connection that provides the processor internet access;
executing a location-based content retrieval application at the processor to transmit location information associated with the processor to a location server and to receive location-based content from the location server in response to the location information; and
generating a display output based on the location-based content, the display output including a map and an indicator, wherein the map identifies a location of a computing device that is distinct from the processor, and wherein the indicator identifies an application of the computing device.

24. The apparatus of claim 23, wherein the indicator includes a screen name assigned to a particular user associated with the computing device.

* * * * *